United States Patent
Sun et al.

(10) Patent No.: US 9,237,108 B2
(45) Date of Patent: Jan. 12, 2016

(54) JITTER BUFFER EMULATION FOR RTP STREAMS IN PASSIVE NETWORK MONITORING SYSTEMS

(71) Applicant: Tektronix, Inc., Beaverton, OR (US)

(72) Inventors: Quenie Q. Sun, Allen, TX (US); John P. Curtin, Richardson, TX (US); Corey A. Garrow, Murphy, TX (US)

(73) Assignee: Tektronix Texas, LLC, Westford, MA (US)

( * ) Notice: Subject to any disclaimer, the term of this patent is extended or adjusted under 35 U.S.C. 154(b) by 201 days.

(21) Appl. No.: 14/104,464

(22) Filed: Dec. 12, 2013

(65) Prior Publication Data

US 2015/0172197 A1    Jun. 18, 2015

(51) Int. Cl.
*H04L 12/28* (2006.01)
*H04L 12/823* (2013.01)
*H04L 12/841* (2013.01)

(52) U.S. Cl.
CPC .............. *H04L 47/32* (2013.01); *H04L 47/283* (2013.01)

(58) Field of Classification Search
CPC ..... H04L 47/32; H04L 47/10; H04L 47/2416; H04L 43/0852; H04L 43/087
See application file for complete search history.

(56) References Cited

U.S. PATENT DOCUMENTS

| | | | |
|---|---|---|---|
| 2002/0167911 A1* | 11/2002 | Hickey | H03L 7/00 370/252 |
| 2011/0194438 A1* | 8/2011 | Rahbar | H04J 3/0664 370/252 |
| 2012/0127859 A1* | 5/2012 | Ko | H04L 47/568 370/232 |

* cited by examiner

*Primary Examiner* — Anh Ngoc Nguyen
(74) *Attorney, Agent, or Firm* — Locke Lord LLP; Scott D. Wofsy; Christopher J. Capelli (57) ABSTRACT

A method for emulating a jitter buffer by a telecommunications network monitoring probe includes determining an RTP timestamp for each of the plurality of received RTP packets. An actual time of arrival is determined for each of the plurality of RTP packets. An expected time of arrival is determined for each of the plurality of RTP packets based, at least in part, upon a difference between the RTP timestamps of successive RTP packets. One or more of the plurality of RTP packets is discarded from the jitter buffer if the actual time of arrival is greater than the expected time of arrival for the one or more RTP packets.

20 Claims, 6 Drawing Sheets

| Packet # | RTP Timestamp | Arrival Time (ms) | Expected Arrival Time (ms) | Expected-Arrival (ms) |
|---|---|---|---|---|
| N | 2114936 | 4049717 | 4049768 | 51 |
| N+1 | 2115256 | 4049742 | 4049788 | 46 |
| N+2 | 2115576 | 4049757 | 4049808 | 51 |
| N+3 | 2115896 | 4049780 | 4049828 | 48 |
| N+4 | 2116216 | 4049800 | 4049848 | 48 |
| N+5 | 2116536 | 4049817 | 4049868 | 51 |
| N+6 | 2116856 | 4049857 | 4049888 | 31 |
| N+7 | 2117176 | 4049945 | 4049908 | -37 |

JITTER BUFFER EMULATION FOR RTP STREAMS IN PASSIVE NETWORK MONITORING SYSTEMS

FIELD OF THE INVENTION

Embodiments of the present invention relate to multimedia streams, and particularly to jitter buffer emulation for audio and video streams.

BACKGROUND OF THE INVENTION

Communication systems that use packet based protocols and packet switching for transmitting multimedia streams, such as digitized voice, audio and video, provide a more flexible and lower cost alternative to traditional telecommunications networks. They do however introduce some problems, notably increased variation in user perceived speech quality due to network impairments. Typical packet networks cause some packets to be lost or delayed which results in the quality of the decoded audio, voice or video being degraded and it is accordingly desirable to have some means of measuring or estimating the subjective or perceptual quality of the decoded audio, voice or video.

In order to reproduce a multimedia stream that is true to the original that was transmitted from the source(s), the decoder (or receiver) must be provided with data packet clusters at the same constant rate with which the data packet clusters were sent. A device often referred to as a jitter buffer may be introduced in the receiver. The jitter buffer may be capable of de-jittering the incoming stream of packets and providing a constant flow of data to the decoder. This is done by holding the packets in a buffer, thus introducing delay, so that also the packets that were subject to larger delays will have arrived before their respective time-of-use.

There is an inevitable trade-off in jitter-buffers between buffer delay on the one hand and distortions due to late arrivals on the other hand. A lower buffer level, and thus a shorter delay, generally results in a larger portion of packets arriving late or even being discarded, as the packets may be considered as being too late, while a higher buffer level, and thus a longer delay, is generally detrimental in itself for two-way communication between, e.g., humans.

Quality monitoring is an important operational scheme for service providers to maintain satisfactory Quality of Experience (QoE) of video and audio services. In order to accurately and timely assess the video and audio quality a variety of passive network monitoring systems typically need to emulate an end device jitter buffer. However, this is not a trivial task because jitter buffer implementation is highly dependent on the type of the end device, the memory and processing power available in the end device, and the types of codec (coder-decoder) supported by the end device.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for emulating a jitter buffer by a telecommunications network monitoring probe is provided. A determination of an Real-time Transport Protocol (RTP) timestamp is made for each of the plurality of received RTP packets. An actual time of arrival is determined for each of the plurality of RTP packets. An expected time of arrival is determined for each of the plurality of RTP packets based upon a difference between the RTP timestamps of successive RTP packets. One or more of the plurality of RTP packets is discarded from the jitter buffer if the actual time of arrival is greater than the expected time of arrival for the one or more RTP packets.

In another aspect, a computer program product for emulating a jitter buffer by a telecommunications network monitoring probe is provided. The computer program product comprises one or more computer-readable storage devices and a plurality of program instructions stored on at least one of the one or more computer-readable storage devices. The plurality of program instructions includes program instructions to receive a plurality of RTP packets. The plurality of program instructions further includes program instructions to determine an RTP timestamp for each of the plurality of RTP packets. The plurality of program instructions further includes program instructions to determine an actual time of arrival for each of the plurality of RTP packets. The plurality of program instructions further includes program instructions to determine an expected time of arrival for each of the plurality of RTP packets based upon a difference between the RTP timestamps of successive RTP packets. The plurality of program instructions further includes program instructions to discard one or more of the plurality of RTP packets from the jitter buffer if the actual time of arrival is greater than the expected time of arrival for the one or more RTP packets.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

The method according to a preferred embodiment of the present invention is directed to techniques to estimate video/audio quality for a video/audio stream transported over Real Time Protocol (RTP). The techniques described in various embodiments are suitable for high capacity passive video/audio stream monitoring and, more specifically, a device-agnostic approach for emulating a jitter buffer. According to a preferred embodiment, a jitter buffer emulation method takes into consideration a plurality of significant time domain factors including difference in RTP timestamps. Advantageously, the method described below is more sensitive to packet loss, discontinuous transmission/reception and/or variable packet arrival rate in a telecommunications system. The method described herein attains this sensitivity because an RTP timestamp difference substantially accurately represents the time duration between two RTP packets that are sent consecutively. As an additional advantage, the jitter buffer emulation method disclosed herein can be used for both audio and video streams, despite its simplicity.

Figure 1:
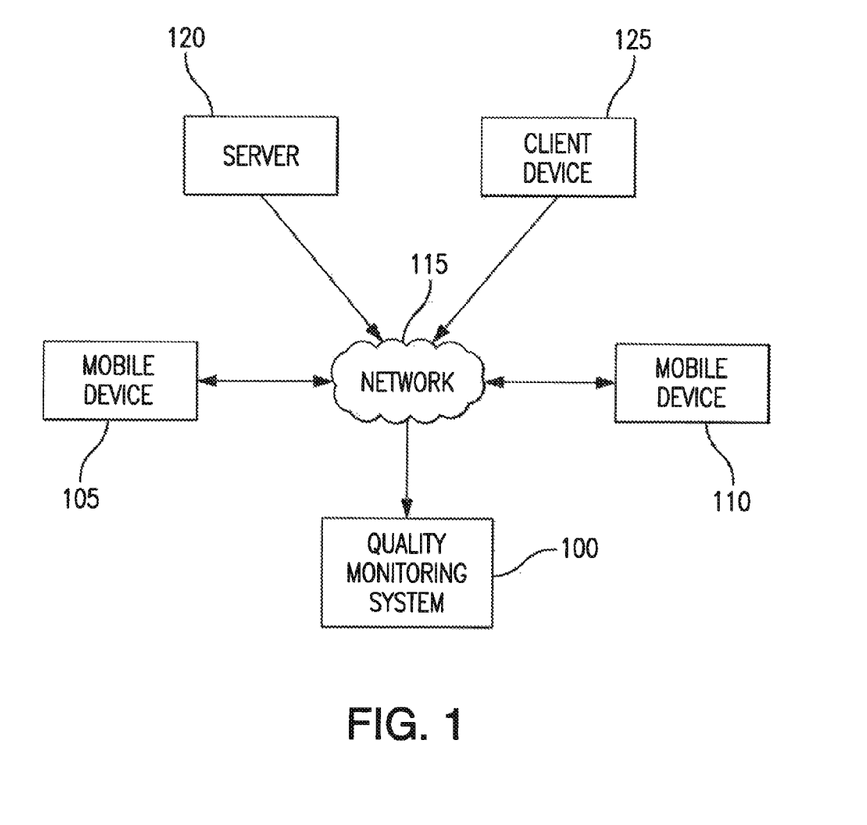
FIG. 1 is a block diagram of a quality monitoring system according to certain illustrative embodiments.

Turning to FIG. 1, a block diagram of a quality monitoring system is shown according to some embodiments. FIG. 1 is intended to provide a brief, general description of an illustrative and/or suitable exemplary environment in which embodiments of the below described present invention may be implemented. FIG. 1 is exemplary of a suitable environment and is not intended to suggest any limitation as to the structure, scope of use, or functionality of an embodiment of the present invention. A particular embodiment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added. As illustrated, server 120 client device 125 mobile devices 105 and 110 may be capable of performing audio/video communication over network 115 Audio and/or video communication sessions between various devices 105, 110, 120, 125 illustrated in FIG. 1 may be monitored by quality monitoring system 100 as data packets comprising those audio/video communications pass through network 115 According to an embodiment of the present invention, RTP protocol may be used to enable audio/video communications taking place in FIG. 1. Moreover, the underlying data within a given stream may be encoded using any of a variety of different standards such as, for example, MPEG-1, MPEG-2, H.263, H.264/MPEG-4, H.265, or other encoding standards.

Each communication session for the various devices 105, 110, 120, 125 may have different start and stop times, and may be subject to different network traffic constraints. During each session, the available bandwidth for that session may change multiple times. Also, a video/audio stream may start and stop during a given session.

Accordingly, quality monitoring system 100 may be configured to sample (e.g., unobtrusively) related data packets for a video/audio communication session in order to estimate quality of user experience for each video/audio with negligible performance impact. For example, by examining only a few fields in each packet of a given session, quality monitoring system 100 may be capable of providing certain information about each user's perceived video quality experience, as described in more detail below. By monitoring QoE related to the customer's communication sessions, such as jitter discarded packets, a service provider may use this information, for instance, to proactively identify network 115 problems, as well as, confirm and resolve customer complaints. In addition, the service provider may adjust the network services available to client devices 105, 110, and/or 125 such as the bandwidth assigned to each user based on a satisfactory quality of video/audio transmitted through network 115.

Generally speaking, client devices 105, 110, and 125 may include any computer system or device such as, for example, a personal computer, laptop computer, tablet computer, mobile device, smart phone, network-enabled devices, web-enabled televisions, and the like. Client devices 105, 110, and 125 may allow users to carry out video/audio communications including, but not limited to, interactive video conferencing. Server 120 may include any server or computer system configured to perform video and/or audio communication. Network 115 may include any suitable wired or wireless/mobile computer or data network including, for example, the Internet, third generation (3G), fourth generation (4G), or Long Term Evolution (LTE) wireless networks. Quality monitoring system 100 may include a network monitor or analyzer, a packet sniffer, a probe, or the like, coupled to network 115.

Figure 2:
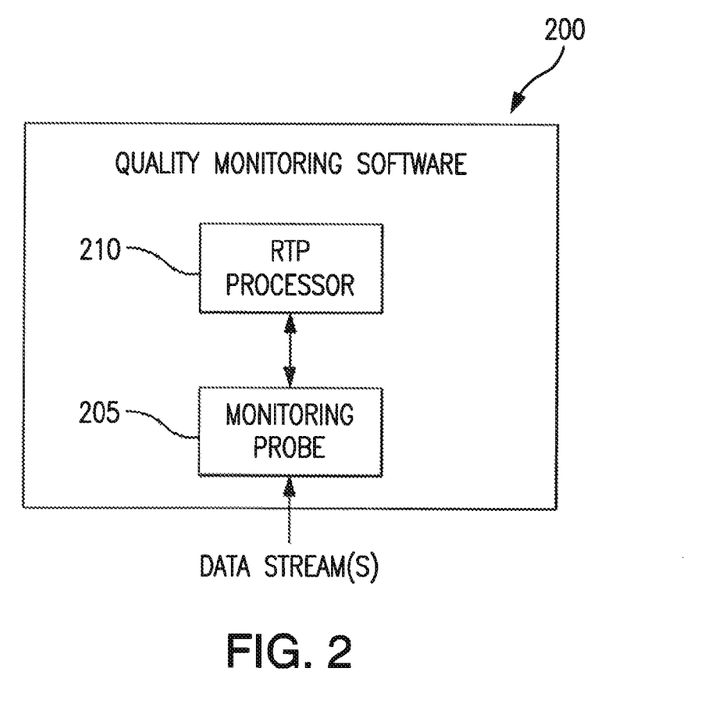
FIG. 2 is a block diagram of a quality monitoring software program, in accordance with an illustrative embodiment of the present invention.

FIG. 2 is a block diagram of a quality monitoring software program. In some embodiments, quality monitoring software 200 may be a software application executable by one or more processors within quality monitoring system 100 of FIG. 1. As previously noted, a plurality of communication sessions or multimedia streams may be transmitted across network 115 between devices 105, 110, 120, and/or 125. Such multimedia communications may be streamed over RTP. The bandwidth may vary on a session-by-session basis and/or may vary during individual multimedia sessions. Packet loss and jitter are typically among the most significant sources for video/audio impairment introduced in multimedia transmission.

Monitoring probe 205 may be configured to capture RTP packets from network 115, including video data from one or more video streams and/or audio data from one or more audio streams. As such, monitoring probe 205 may determine identifying information for the captured RTP packets and combine related data into session records. Monitoring probe 205 may then feed session records and captured RTP packet data to RTP processor program 210. In some cases, a session record may include multiple segments that are provided to RTP processor program 210 periodically while an associated video/audio communication session is active.

In order to cope with out of sequence packets and retransmitted packets, end devices decoding RTP packets typically implement a jitter buffer element to re-sequence the out of sequence RTP packets and to remove duplicate packets. Packets with excessive jitter could be discarded due to, for instance, jitter buffer underflow. In a preferred embodiment of the present invention, RTP processor program 210 may emulate a jitter buffer to mark underflow packets as jitter buffer discards. RTP processor program 210 preferably considers jitter discarded packets as lost packets in terms of their impact on video/audio quality.

Figure 3:
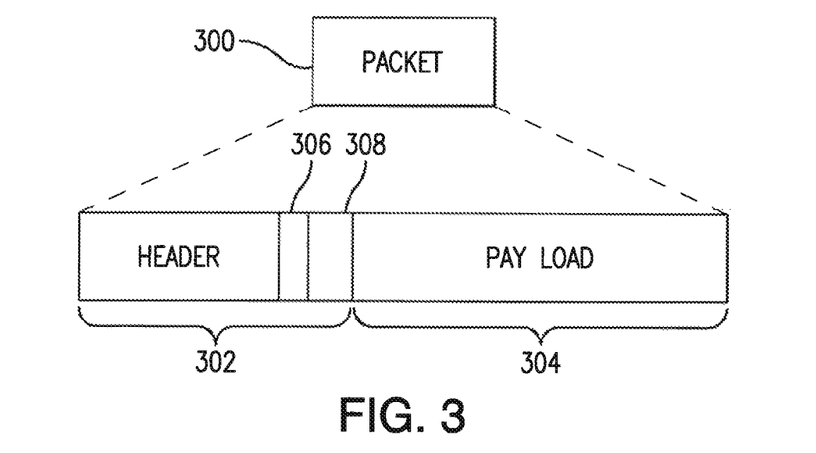
FIG. 3 is a diagram illustrating a structure of a transport layer packet, in accordance with an illustrative embodiment of the present invention.

FIG. 3 is diagram illustrating a structure of a RTP packet 300, in accordance with an illustrative embodiment of the present invention. Particularly, RTP packet 300 includes RTP header portion 302 and payload portion 304. The most dynamically changed fields in the RTP header 302 are the RTP sequence number 306 and RTP timestamp 308. Each RTP header 302 includes a RTP sequence number 306 to permit proper ordering of the RTP packets. Accordingly, each RTP packet header 302 has a different, generally, incrementally higher sequence number. The RTP timestamp 308 indicates the sampling time of the first byte in the RTP packet 300.

Data are transferred in modern RTP-based communication systems in asynchronous packets 300. Generally, in packet-switched multimedia communication, maximum QoE is achieved when RTP packets 300 arrive in the order that they were transmitted, at the exact rate that they are transmitted, and with the shortest possible transmission delay. The end-to-end delay of a RTP packet 300 may be defined as the time from its generation at the sender side to when the RTP packet 300 reaches its destination. Delays occurring in a packet-switched network 115 to travel from source to destination may vary depending upon various operating conditions, including but not limited to, channel conditions and network 115 loading (each RTP packet 300 may be routed in different paths).

The end-to-end delay includes the delays introduced in the network 115 and the various elements through which the RTP packet 300 passes. Many factors contribute to end-to-end delay. Variance in the end-to-end delay is referred to as jitter. Jitter may cause RTP packets to be received after the RTP packets are no longer useful or may cause RTP packets arriving earlier at the receiver side and resulting in "out-of-sequence" packets. Since the jitter can change substantially from one communication session to another, or even during the same communication session, it is of interest to adapt some characteristics of the used jitter buffer to the circumstances (adaptive jitter buffer). In order to attain a high level of QoE in real time multimedia communication sessions it is important to control and minimize all delays occurring in the network 115 As a result, modern communication systems that use packet based protocols generally require that a given receiver include a jitter buffer that allows the receiver to convert asynchronous received packets to synchronous video/audio signals suitable for presentation in audibly and/or visually perceptible format or for further transmission over synchronous network. A jitter buffer is typically a serial storage unit used to compensate for variation in inter-packet arrival times. The jitter buffer approximates a first-in-first-out (FIFO) with a variable input rate and a constant output rate. Accordingly, traditional jitter buffer emulation techniques typically implement a packet buffer. These techniques contemplate inserting packets to the buffer as they arrive and extracting the packets from the buffer at certain rate.

Figure 4:
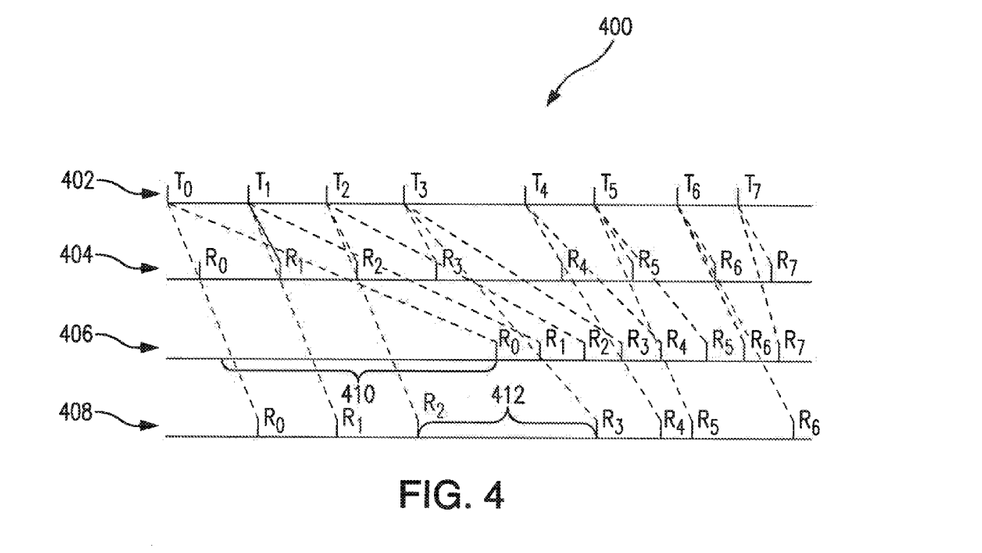
FIG. 4 is a timing diagram illustrating transmission and reception for packets resulting from jittered communication.

Timing diagram 400 of FIG. 4, illustrates exemplary data stream flows between the sender and the jitter buffer implemented by, for example, the monitoring probe 205. It is noted that in FIG. 4, $T_n$ represents the RTP timestamp 308 in RTP packet header 302, which is typically stamped by the sender of the stream and represents the wall clock time (absolute time) when the packet is received by the monitoring probe 205. FIG. 4 illustrates three different data stream flows 404-408. Top line 402 in FIG. 4 depicts a plurality of RTP timestamps $T_0$-$T_7$ corresponding to eight RTP packets transmitted by the sender of the stream.

Data flow 404 in FIG. 4 is an example of ideal transmitting environment where RTP packets arrive at the jitter buffer evenly after experiencing substantially constant transmission delay. $R_0$-$R_7$ represent arrival times for the eight RTP packets transmitted by the sender of the stream. The purpose of the jitter buffer is to hold the received RTP packets for a specified period of time before forwarding them to the next functional unit (e.g., stream player) in a regular time interval. In one implementation of a typical communication system, a jitter buffer may operate as follows: when a first RTP packet arrives at the receiver's side (at time $R_0$), the RTP packet is placed in the jitter buffer. The receiver then starts a timer. The timer is called the initial waiting time. When the timer expires, the receiver reads the first RTP packet from the buffer and uses it. The receiver then sets a recurring timer. The interval of the recurring timer usually matches the nominal playback duration of each RTP packet. As the following RTP packets arrive (at $R_1$-$R_7$), the receiver places them in the jitter buffer. As the recurring timer expires the receiver reads the next packet from the buffer. Since in data flow 404 RTP packets arrive evenly, jitter is very low, thus jitter discard can be avoided and QoE for such data flow 404 is likely to be very high.

However, the RTP packets sent by the sender of the stream may experience a variable delay (jitter) crossing the transport channel. Data flow 406 in FIG. 4 illustrates an overflow case. In illustrative data flow 406 a group of RTP packets experienced congestion and were delayed as a result. For example, first RTP packet arrived at time $R_0$ after experiencing a delay corresponding to time interval 410. In addition, as a result of the variable delay crossing the transport channel, the majority of the eight packets transmitted by the sender of the stream arrived at the receiver in a burst. Typically a jitter buffer has a limited storage capacity. As mentioned above packets are typically extracted from the jitter buffer at substantially constant rate (as the recurring timer expires), regardless of the packet arrival rate. Thus, if an RTP packet arrived when the jitter buffer is full and there is no place to store it, the packet is discarded and counted as lost in playback (buffer overflow). Data flow 408 in FIG. 4 illustrates an underflow case.

In the illustrative data flow 408, the fourth RTP packet (arrived at time $R_3$) experiencing a delay corresponding to time interval 412. If the fourth RTP packet has not arrived by the time the receiver attempts to read it from the jitter buffer, this particular packet is counted as lost (buffer underflow). The problem of jitter illustrated in FIG. 4 typically can be solved by using a sufficiently large dimensioned jitter buffer at the receiver of the communication system together with a correct policy of buffer management. However, both jitter buffer storage capacity and buffer management policies are implemented differently in various end devices. None of these implementation details are known to the quality monitoring system 100 yet the quality monitoring system 100 typically needs to support various types of devices and codecs.

Various embodiments of the present invention contemplate a jitter buffer emulation method which shifts optimization from the packet domain to the time domain. The method described below is agnostic of end device implementations.

Figure 5:
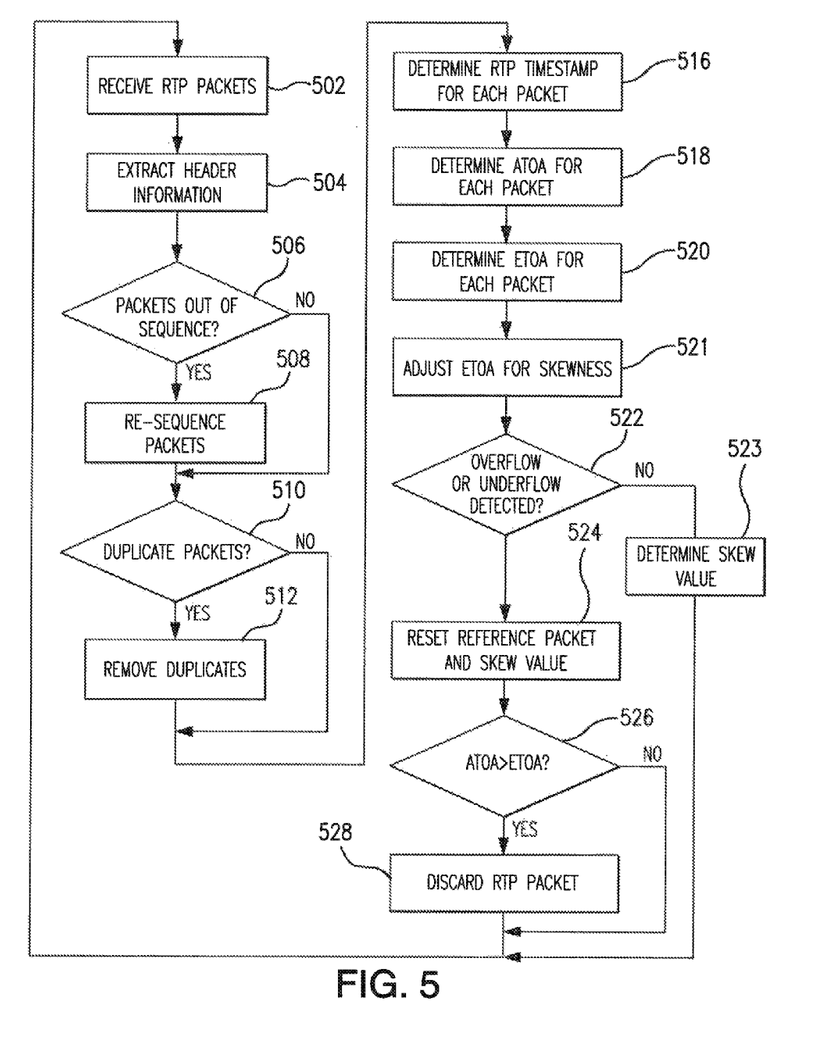
FIG. 5 is a flowchart of operational steps of the RTP processor program of FIG. 2, in accordance with an illustrative embodiment of the present invention.

FIG. 5 is a flowchart of operational steps of the RTP processor program 210 of FIG. 2, in accordance with an illustrative embodiment of the present invention. RTP processor program 210 may be, for example, a computer program or program component configured to process RTP packets, detect packet loss, and emulate a jitter buffer to mark underflow packets as jitter buffer discards, among other functions. At step 502, RTP processor program 210 preferably receives a sample of RTP packets captured by monitoring probe 205. In an embodiment of the present invention, monitoring probe 205 may transmit generated session records along with captured RTP packet data to RTP processor program 210. The session records are associated with at least a portion of a multimedia communication session over an RTP network. In some cases, a session record may include multiple segments that are provided to RTP processor program 210 periodically while an associated multimedia communication session is active.

At step 504, RTP processor program 210 preferably processes RTP packets received at step 502. In an embodiment of the present invention, RTP processor program 210 preferably examines RTP headers 302 and extracts some information for each of the received packets. Standard RTP header 302 typically contains the RTP sequence number 306 and RTP timestamp 308. RTP sequence number 306 can be used by RTP processor program 210 to detect a packet loss and to ensure that packets are decoded in the correct order. Consequently, at step 506, RTP processor program 210 preferably determines whether any of the received RTP packets is out of sequence based on the determined RTP sequence numbers 306. In response to determining that one or more of the received RTP packets are out of sequence (step 506, yes branch), RTP processor program 210, at step 508, preferably re-sequences packets to ensure that RTP packets are decoded in the correct order. This step includes maintaining a next expected sequence number for each RTP connection monitored for re-sequencing. This step preferably further includes matching the next expected sequence number to the RTP packet sequence number of an RTP packet being processed. After re-sequencing RTP packets or in response to determining that none of the received RTP packets are out of order (step 506, no branch), RTP processor program 210 preferably determines whether any duplicate RTP packets have been received, at step 510. The RTP processor program 210 can detect a duplicate packet by examining RTP sequence numbers 306 to find two or more RTP packets having the same sequence numbers 306. In response to determining that one or more of the received RTP packets are duplicates (step 510, yes branch), RTP processor program 210, at step 512, preferably removes such packets from the multimedia stream.

After removing duplicate RTP packets or in response to determining that no packets have the same sequence numbers 306 (step 510, no branch), RTP processor program 210 preferably determines RTP timestamps 308 for each of the received packets, at step 516. In an embodiment of the present invention, RTP processor program 210 preferably extracts this information from the RTP header 302. Next, at 518, RTP processor program 210 preferably determines actual time of arrival for each received packet. In an embodiment of the present invention, the actual time of arrival of an RTP packet may be provided to the RTP processor program 210, for example, by a reference clock signal generated by monitoring probe 205. For example, a 'put' function called by the monitoring probe 205 may provide an RTP packet and the reference clock signal so that the RTP processor program 210 is provided with the actual time of arrival of the 'put' data packet.

The RTP processor program 210 can then determine an expected time of arrival of each of the received RTP packets, at step 520. The basic principle of jitter buffer emulation disclosed herein is that by adding an initial delay, the receiving device (receiver) can buffer a few packets. According to an embodiment of the present invention, once the first RTP packet is retrieved from the jitter buffer, the successive packets are taken out of the jitter buffer according to a determined time interval indicated by RTP timestamp 308. Advantageously, this technique allows the jitter buffer emulator (i.e. RTP processor program 210) to smooth the variances introduced during transmission. In an embodiment of the present invention, the RTP processor program 210 may determine an expected time of arrival for each received RTP packet following the reference RTP packet (i.e., first received packet) according to the following formula:

$$ER_n = R_0 + (T_n - T_0)/\text{ClockRate} + D, \quad (1)$$

where $ER_n$ is the expected arrival time of packet #n, $R_0$ is the actual arrival time of the reference packet, $T_0$ is the RTP timestamp 308 of the reference packet, $T_n$ is the RTP timestamp 308 of the n-th packet, D is the initial delay introduced by the jitter buffer, ClockRate is the stamping rate of the reference clock signal (i.e., the rate at which RTP timestamps 308 are generated). In an embodiment of the present invention, the Clock Rate is a static parameter provided to the RTP processor program 210, for example, by monitoring probe 205. It is noted that the timing analysis in the above formula focuses on measuring the relative time difference from the sender's perspective (i.e., time-of-departure difference) using RTP timestamp 308, and from the monitoring probe's 205 perspective (i.e., arrival time) using the wall clock time (absolute time). It is further noted that synchronization of the sender's clock signal and monitoring probe's 205 clock signals is not relevant for the purposes of determining an expected arrival time because the above formula uses only the relative time differences. Table 1 below illustrates how RTP processor program 210 can determine the expected arrival time for the plurality of received RTP packets using the formula above:

TABLE 1

| Packet # | RTP Timestamp | Actual Arrival Time | Expected Arrival Time |
|---|---|---|---|
| 0 | $T_0$ | $R_0$ | |
| 1 | $T_1$ | $R_1$ | $R_0 + (T_1 - T_0)/ClockRate + D$ |
| 2 | $T_2$ | $R_2$ | $R_0 + (T_2 - T_0)/ClockRate + D$ |
| 3 | $T_3$ | $R_3$ | $R_0 + (T_3 - T_0)/ClockRate + D$ |
| 4 | $T_4$ | $R_4$ | $R_0 + (T_4 - T_0)/ClockRate + D$ |
| 5 | $T_5$ | $R_5$ | $R_0 + (T_5 - T_0)/ClockRate + D$ |
| 6 | $T_6$ | $R_6$ | $R_0 + (T_6 - T_0)/ClockRate + D$ |
| 7 | $T_7$ | $R_7$ | $R_0 + (T_7 - T_0)/ClockRate + D$ |

As shown in Table 1, RTP processor program 210 can determine the expected time of arrival of each of the second, third, fourth, and so on RTP packets based on $T_0$ and $R_0$ (RTP timestamp and actual arrival time of the reference packet, respectively). However, as illustrated in FIG. 4 (data flows 406 and 408), jitter buffer underflow and jitter buffer overflow events, respectively, may occur during data transmission.

Figure 6A:
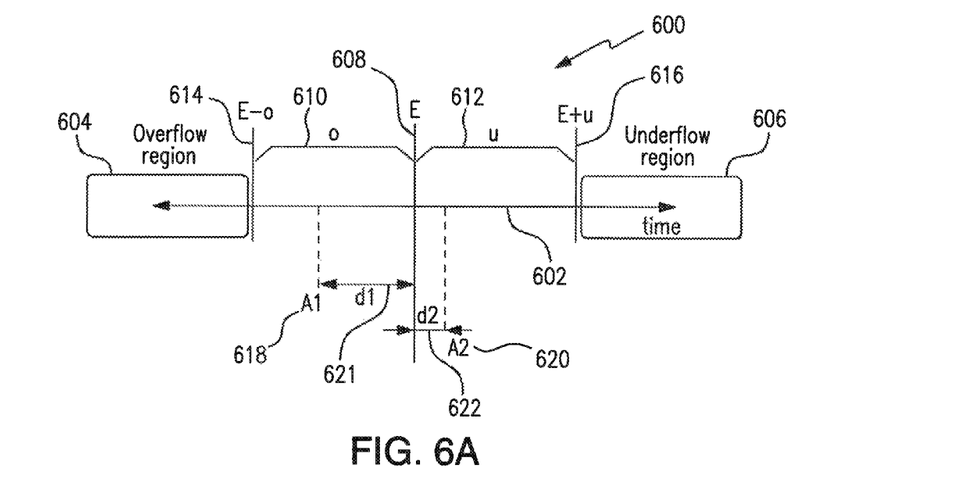
FIG. 6A is a timing diagram illustrating a jitter buffer emulation technique implemented by the RTP processor program of FIG. 2, in accordance with an illustrative embodiment of the present invention.

FIG. 6A is a timing diagram 600 illustrating a jitter buffer emulation technique implemented by the RTP processor program of FIG. 2, in accordance with an illustrative embodiment of the present invention. The horizontal axis 602 in FIG. 6A represents the time axis. The vertical line 608 in FIG. 6A depicts an exemplary expected arrival time for a given RTP packet. If the transmitting environment is substantially close to ideal and there is little or no jitter, the actual arrival time of the given RTP packet should be relatively close to the expected arrival time 608 with respect to time axis 602. In FIG. 6A, a first dotted line A1 618 depicts actual arrival time of the RTP packet that arrived slightly before the expected arrival time 608. On the other hand, a second dotted line A2 620 depicts actual arrival time of the RTP packet that arrived slightly after the expected arrival time 608.

However, if the given packet arrives much latter than the expected arrival time 608 (within the second region 606 in the timing diagram 600), then it is highly likely that the given packet was delayed, thus causing the jitter buffer to completely drain. This is considered to be a jitter buffer underflow event. If the given packet arrives much earlier than the expected arrival time 608 (within the first region 604 in the timing diagram 600), then it is highly likely that the given packet arrived too quickly, thus potentially causing the jitter buffer to overflow. This is considered to be a jitter buffer overflow event.

As shown in FIG. 6A, an overflow duration interval 610 and an underflow duration interval 612 may separate respective overflow region 604 and underflow region 606 from the expected arrival time 608. Vertical lines 614 and 616 in FIG. 6A illustrate boundaries of the respected overflow 604 and underflow 606 regions. In an embodiment of the present invention, both the overflow duration interval 610 and the underflow duration interval 612 may be equal to 60 ms, for example.

According to an embodiment of the present invention, RTP processor program 210 may need to dynamically adjust the expected arrival time 608 if RTP packets arrive substantially consistently early or substantially consistently late due to improper selection of the reference packet, for instance. In the timing diagram 600 of FIG. 6A, first actual arrival time 618 is distanced from the expected arrival time 608 by a first duration period ($d_1$) 621, while second actual arrival time 620 is distanced from the expected arrival time 608 by a second duration period ($d_2$) 622. If all RTP packets consistently arrive substantially close to first actual arrival time 618, there is a smaller margin to avoid classifying an RTP as a jitter buffer overflow. Similarly, if all RTP packets consistently arrive substantially close to second actual arrival time 622, there is a smaller margin to avoid classifying an RTP as a jitter buffer underflow. According to an embodiment of the present invention, to overcome the above mentioned effect RTP processor program 210 may utilize the concept of skewness. It will be appreciated that a skew value indicative of skewness of discrete arrival time values may be represented by an average of duration periods (i.e., $d_1$ 621 and $d_2$ 622) calculated by RTP processor program 210 for the plurality of processed RTP packets. In an embodiment of the present invention, the RTP processor program 210 may determine each duration period (d) using the following formula:

$$d = E - A \qquad (2)$$

where E represents the expected arrival time of a given RTP packet and A represents the actual arrival time of the given RTP packet. Furthermore, the RTP processor program 210 may determine the skew value(s) using formula (3):

$$s = (s*((N-1)/N)) + (d/N) \qquad (3)$$

where d represents the duration value which may be calculated by formula (2) and N represents a predetermined number of RTP packets under consideration. In a preferred embodiment of the present invention, N may be a value of the n-th power of 2, such as 2, 4, 8, 16, and the like.

Referring back to FIG. 5, at step 521, RTP processor program 210 preferably dynamically adjusts the expected arrival time for each RTP packet. In an embodiment of the present invention, RTP processor 210 may utilize the following formula to adjust the expected arrival time:

$$\text{adjusted } E = E - s \qquad (4)$$

where s represents the skew value which may be determined using formula (3).

At step 522, RTP processor program 210 preferably evaluates each packet to determine whether an underflow or overflow event has occurred. In an embodiment of the present invention, RTP processor program 210 may detect a jitter buffer underflow event if the following condition is satisfied:

If $A > \text{adjusted } E + u$ where A represents the actual arrival time of the given RTP packet, adjusted E represents expected arrival time adjusted for skewness in step 521, and u represents an underflow duration interval 612. Furthermore, RTP processor program 210 may detect a jitter buffer overflow event if the following condition is satisfied:

If $A < \text{adjusted } E - o$ where o represents an overflow duration interval 610.

In response to determining that neither the underflow nor the overflow has occurred (step 522, no branch) RTP processor program 210, at step 523, preferably determines the skew value for next iteration of steps 516-521. According to an embodiment of the present invention, RTP processor program 210 may determine the skew value using formula (3) above. If either the underflow or the overflow events has occurred (step 522, yes branch), RTP processor program 210 preferably resets the reference packet and skew value for packets that are considered either jitter buffer underflows or jitter buffer overflows. It is noted that if RTP processor program 210 does not reset reference frame and the skew value, the expected arrival time might get inflated for the packets following either the jitter buffer overflow event or the jitter buffer underflow event. In an embodiment of the present invention, RTP processor program 210 may reset the skew value to 0 at step 524.

After resetting the reference packet and the skew value for RTP packets that are considered either jitter buffer underflows or jitter buffer overflows, at 526, RTP processor 210 preferably compares the actual arrival time for the received RTP packets with the adjusted expected arrival time. The difference between the expected time of arrival and the actual time of arrival of RTP packets corresponds to a delay which may be positive or negative depending on whether the packet is received too early or too late and which may be due to jitter delays. In response to determining that for one or more of the received RTP packets the actual time of arrival value is greater than the expected time of arrival (step 526, yes branch), at 528, RTP processor 210 preferably marks the one or more packets as jitter buffer discards, according to an embodiment of the present invention. In other words, RTP processor program 210 preferably considers only jitter buffer underflow packets as jitter discards, because they may affect the quality of video and/or audio playback. Once RTP processor 210 identifies the discarded packets (if any), it may continue with processing the next segment of RTP packets received from monitoring probe 205.

Figure 6B:
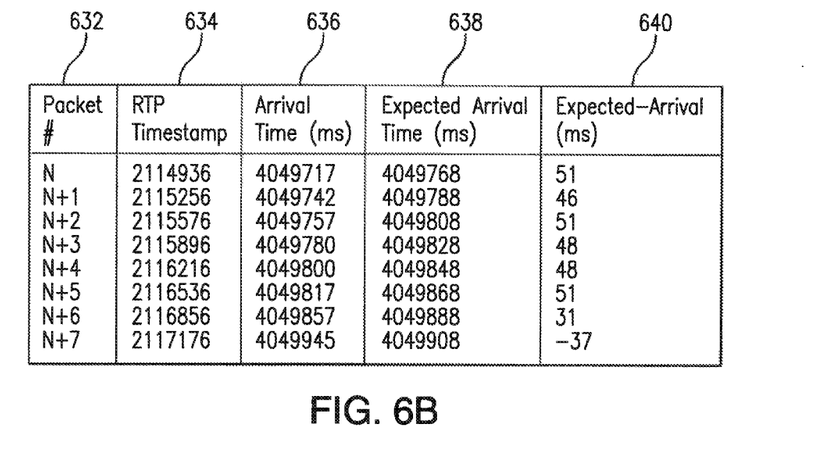
FIG. 6B is a table illustrating an example of timing analysis performed by the RTP processor program of FIG. 2, in accordance with an illustrative embodiment of the present invention.

FIG. 6B is a table illustrating an example of timing analysis performed by the RTP processor program 210 in steps 518-528 of FIG. 5 for a subset of the received RTP packets, in accordance with an illustrative embodiment of the present invention. The first column 632 of FIG. 6B is the packet number, the second column 634 is the RTP timestamp 308, the third column 636 is RTP packet's actual arrival time, the fourth column 638 is RTP packet's expected arrival time, and the fifth column 640 of FIG. 6B is the difference between the expected time of arrival and the actual time of arrival of corresponding RTP packets. As mentioned above, the difference 640 between the expected time of arrival and the actual time of arrival of RTP packets may be positive or negative depending on the presence of jitter delays. Since this difference 640 is negative (−37) for the last packet shown in FIG. 6B, RTP processor 210 preferably marks the RTP packet number N+7 as jitter buffer discard, in accordance with an embodiment of the present invention.

In summary, various embodiments of the present invention provide an improved jitter buffer emulation technique that is agnostic of end device implementations, media types and codec types. The technique described herein is simple to implement. Advantageously, various embodiments described herein shift the emulation to time domain, since there will always be an upper bound allowance for the delay added by the jitter buffer. Another advantage of the disclosed herein jitter buffer emulation technique is that it is capable of dynamically adjusting the expected arrival time of packets following the initial burst, which results in more accurate determination of jitter buffer discards.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
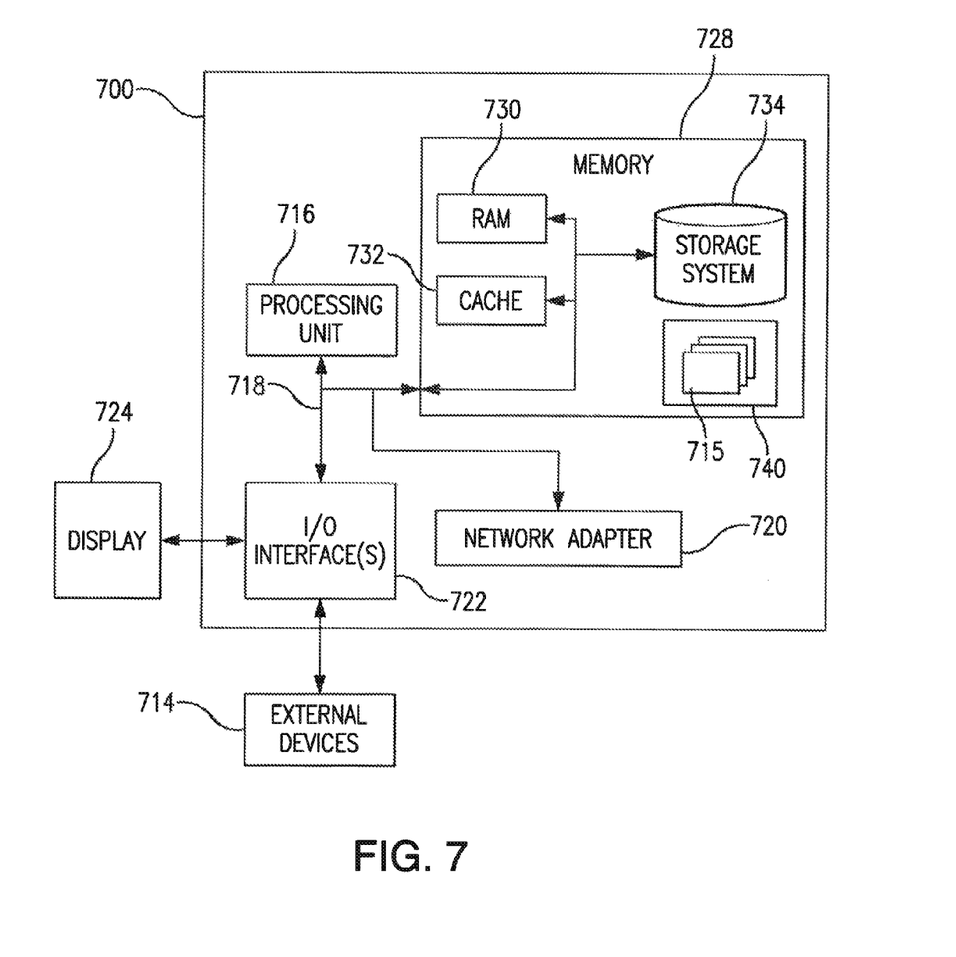
FIG. 7 is a block diagram of a computer system configured to implement various systems and methods described herein according to some embodiments.

Embodiments of video quality monitoring system 100 may be implemented or executed by one or more computer systems. One such computer system is illustrated in FIG. 7. In various embodiments, computer system 700 may be a server, a mainframe computer system, a workstation, a network computer, a desktop computer, a laptop, or the like. For example, in some cases, video quality monitoring system 100 shown in FIG. 1 may be implemented as computer system 700. Moreover, one or more of devices 105, 110, 120 and 125 may include one or more computers in the form of computer system 700. As explained above, in different embodiments these various computer systems may be configured to communicate with each other in any suitable way, such as, for example, via network 115.

Computer system 700 is only one example of a suitable system and is not intended to suggest any limitation as to the scope of use or functionality of embodiments of the invention described herein. Regardless, computer system 700 is capable of being implemented and/or performing any of the functionality set forth hereinabove.

Computer system 700 is operational with numerous other general purpose or special purpose computing system environments or configurations. Examples of well-known computing systems, environments, and/or configurations that may be suitable for use with computer system 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computer system 700 may be described in the general context of computer system-executable instructions, such as program modules, being executed by a computer system. Generally, program modules may include routines, programs, objects, components, logic, data structures, and so on that perform particular tasks or implement particular abstract data types. Computer system 700 may be practiced in distributed data processing environments where tasks are performed by remote processing devices that are linked through a communications network. In a distributed data processing environment, program modules may be located in both local and remote computer system storage media including memory storage devices.

Computer system 700 is shown in FIG. 7 in the form of a general-purpose computing device. The components of computer system 700 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 700 typically includes a variety of computer system readable media. Such media may be any available media that is accessible by computer system 700, and it includes both volatile and non-volatile media, removable and non-removable media.

System memory 728 can include computer system readable media in the form of volatile memory, such as random access memory (RAM) 730 and/or cache memory 732. Computer system 700 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 715, such as video quality monitoring software 200, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the invention as described herein.

Computer system 700 may also communicate with one or more external devices 714 such as a keyboard, a pointing device, a display 724, etc.; one or more devices that enable a user to interact with computer system 700; and/or any devices (e.g., network card, modem, etc.) that enable computer system 700 to communicate with one or more other computing devices. Such communication can occur via Input/Output (I/O) interfaces 722. Still yet, computer system 700 can communicate with one or more networks such as a local area network (LAN), a general wide area network (WAN), and/or a public network (e.g., the Internet) via network adapter 720. As depicted, network adapter 720 communicates with the other components of computer system 700 via bus 718. It should be understood that although not shown, other hardware and/or software components could be used in conjunction with computer system 700. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for emulating a jitter buffer by a telecommunications network monitoring probe, the method comprising the steps of:
    receiving a plurality of real-time transmission protocol (RTP) packets;
    determining an RTP timestamp for each of the plurality of RTP packets;
    determining an actual time of arrival for each of the plurality of RTP packets;
    determining an expected time of arrival for each of the plurality of RTP packets based upon a difference between the RTP timestamps of successive RTP packets; and
    discarding one or more of the plurality of RTP packets from the jitter buffer if the actual time of arrival is greater than the expected time of arrival for the one or more RTP packets.

2. The method of claim 1, further comprising storing the plurality of RTP packets in the jitter buffer after said step of receiving a plurality of RTP packets.

3. The method of claim 1, wherein the received plurality of RTP packets comprises an audio stream.

4. The method of claim 1, wherein the received plurality of RTP packets comprises a video stream.

5. The method of claim 2, further comprising the steps of, performed after the step of storing the plurality of RTP packets:
    extracting header information from the plurality of RTP packets including a sequence number indicative of RTP packet order;
    identifying out of sequence RTP packets from the plurality of RTP packets based on the extracted header information;
    identifying duplicate RTP packets from the plurality of RTP packets based on the extracted header information;
    reordering the out of sequence RTP packets; and
    removing the duplicate RTP packets from the jitter buffer.

6. The method of claim 1, wherein the expected time of arrival includes an initial delay value.

7. The method of claim 1, wherein the expected time of arrival is dynamically adjusted by a skew value.

8. A computer readable storage device for emulating a jitter buffer by a telecommunications network monitoring probe, the computer readable storage device storing a plurality of program instructions for execution by at least one processor, the plurality of program instructions comprising:
    program instructions to receive a plurality of real-time transmission protocol (RTP) packets;
    program instructions to determine an RTP timestamp for each of the plurality of RTP packets;
    program instructions to determine an actual time of arrival for each of the plurality of RTP packets;
    program instructions to determine an expected time of arrival for each of the plurality of RTP packets based upon a difference between the RTP timestamps of successive RTP packets; and
    program instructions to discard one or more of the plurality of RTP packets from the jitter buffer if the actual time of arrival is greater than the expected time of arrival for the one or more RTP packets.

9. The computer program product of claim 8, further comprising program instructions to store the plurality of RTP packets in the jitter buffer.

10. The computer program product of claim 8, wherein the received plurality of RTP packets comprises an audio stream.

11. The computer program product of claim 8, wherein the received plurality of RTP packets comprises a video stream.

12. The computer program product of claim 9, further comprising:
    program instructions to extract header information from the plurality of RTP packets including a sequence number indicative of RTP packet order;
    program instructions to identify out of sequence RTP packets from the plurality of RTP packets based on the extracted header information;
    program instructions to identify duplicate RTP packets from the plurality of RTP packets based on the extracted header information;
    program instructions to reorder the out of sequence RTP packets; and
    program instructions to remove the duplicate RTP packets from the jitter buffer.

13. The computer program product of claim 8, wherein the expected time of arrival includes an initial delay value.

14. The computer program product of claim 8, further comprising program instructions to dynamically adjust the expected time of arrival by a skew value.

15. A computer system for emulating a jitter buffer by a telecommunications network monitoring probe, the computer system comprising one or more processors, one or more computer-readable storage devices, and a plurality of program instructions stored on at least one of the one or more storage devices for execution by at least one of the one or more processors, the plurality of program instructions comprising:
    program instructions to receive a plurality of real-time transmission protocol (RTP) packets;
    program instructions to determine an RTP timestamp for each of the plurality of RTP packets;
    program instructions to determine an actual time of arrival for each of the plurality of RTP packets;
    program instructions to determine an expected time of arrival for each of the plurality of RTP packets based upon a difference between the RTP timestamps of successive RTP packets; and program instructions to discard one or more of the plurality of RTP packets from the jitter buffer if the actual time of arrival is greater than the expected time of arrival for the one or more RTP packets.

16. The computer system of claim 15, further comprising program instructions to store the plurality of RTP packets in the jitter buffer.

17. The computer system of claim 15, wherein the received plurality of RTP packets comprises an audio stream.

18. The computer system of claim 15, wherein the received plurality of RTP packets comprises a video stream.

19. The computer system of claim 15, further comprising:
   program instructions to extract header information from the plurality of RTP packets including a sequence number indicative of RTP packet order;
   program instructions to identify out of sequence RTP packets from the plurality of RTP packets based on the extracted header information;
   program instructions to identify duplicate RTP packets from the plurality of RTP packets based on the extracted header information;
   program instructions to reorder the out of sequence RTP packets; and
   program instructions to remove the duplicate RTP packets from the jitter buffer.

20. The computer system of claim 15, further comprising program instructions to dynamically adjust the expected time of arrival by a skew value.

* * * * *